US005896129A

United States Patent [19]
Murphy et al.

[11] Patent Number: 5,896,129
[45] Date of Patent: Apr. 20, 1999

[54] USER FRIENDLY PASSENGER INTERFACE INCLUDING AUDIO MENUING FOR THE VISUALLY IMPAIRED AND CLOSED CAPTIONING FOR THE HEARING IMPAIRED FOR AN INTERACTIVE FLIGHT ENTERTAINMENT SYSTEM

[75] Inventors: John F. Murphy, La Mirada; Karen L. Evensen, Lake Forest; Kunjan Zaveri, Arcadia; David J. Weidenkopf, Corona; Joni C. Moore, Mission Viejo, all of Calif.

[73] Assignees: Sony Corporation, Tokyo, Japan; Sony Trans Com, Inc., Irvine, Calif.

[21] Appl. No.: 08/713,545

[22] Filed: Sep. 13, 1996

[51] Int. Cl.⁶ .................................................. H04N 7/16
[52] U.S. Cl. .................................... 345/327; 348/8
[58] Field of Search .......................... 348/8, 62, 117, 348/119, 121, 123; 455/3.1, 6.1, 6.3; 345/327

[56] References Cited

U.S. PATENT DOCUMENTS

| | | | |
|---|---|---|---|
| 3,795,771 | 3/1974 | Gunderson et al. | 179/15 |
| 4,352,124 | 9/1982 | Kline | 358/60 |
| 4,352,200 | 9/1982 | Oxman | 455/41 |
| 4,428,078 | 1/1984 | Kuo | 455/3 |
| 4,584,603 | 4/1986 | Harrison | 358/86 |
| 4,647,980 | 3/1987 | Steventon et al. | 358/254 |
| 4,756,528 | 7/1988 | Umashankar | 273/1 |
| 4,763,360 | 8/1988 | Daniels et al. | 455/3 |
| 4,774,514 | 9/1988 | Hildebrandt et al. | 340/971 |
| 4,835,604 | 5/1989 | Kondo et al. | 358/86 |
| 4,853,555 | 8/1989 | Wheat | 307/9.1 |
| 4,866,515 | 9/1989 | Tagawa et al. | 358/86 |
| 4,896,209 | 1/1990 | Matsuzaki et al. | 358/86 |
| 4,897,714 | 1/1990 | Ichise et al. | 358/86 |
| 4,920,432 | 4/1990 | Eggers et al. | 360/33.1 |
| 4,975,696 | 12/1990 | Salter, Jr. et al. | 340/973 |
| 4,992,865 | 2/1991 | Park | 348/62 |
| 5,123,015 | 6/1992 | Brady, Jr. et al. | 370/112 |
| 5,214,505 | 5/1993 | Rabowsky et al. | 358/86 |

(List continued on next page.)

OTHER PUBLICATIONS

"MDDS is Here!", Unlisted, *Digital Video News* Jul. 1995.
"Optibase & BEA Make MPEG Fly!", Unlisted, *Digital Video News* Jul. 1995.
"Flying Those Interactive Skies", Morris, *TV Technology* Oct. 1995.
"Video–On–Demand Trail Starts on Alitalia Airlines Other Airplane Tests Have Same Maddening Delays as Cable/Telco Trials", Unlisted, *European Media Business & Finance* Nov. 3, 1995.

(List continued on next page.)

[57] ABSTRACT

Audio menuing for the visually impaired, closed captioning for the hearing impaired and graphical tab control user interface for an interactive flight entertainment system (IFES). With the preferred embodiment, passenger control handset (PCH) in Braille is utilized. Given inputs from the passenger through use of the PCH, the keystrokes are transmitted to a seat electronics unit (SEU) as keystroke signals and processed by a device driver. The device driver transmits the keystroke signals to the pre-existing user interface and to the present invention's audio menu module. For the audio menu module, the menu resource database makes available a file of various audio information corresponding to various passenger keystroke inputs. Once the appropriate passenger output information is retrieved from the menu resource database, the information is output to the passenger via a display device and a headset coupled to the SEU. A closed captioning capability is enabled when a passenger selects a closed captioning option icon on the screen of the display device. Once such selection is made, audio information is printed and displayed to the passenger on the screen of the display device. A touch screen user interface having graphical tab controls for paging is also provided.

*Primary Examiner*—Nathan Flynn
*Attorney, Agent, or Firm*—Blakely, Sokoloff, Taylor & Zafman LLP

23 Claims, 6 Drawing Sheets

U.S. PATENT DOCUMENTS

| | | | |
|---|---|---|---|
| 5,220,419 | 6/1993 | Sklar et al. | 358/86 |
| 5,289,272 | 2/1994 | Rabowsky et al. | 348/8 |
| 5,311,302 | 5/1994 | Berry et al. | 348/14 |
| 5,347,632 | 9/1994 | Filepp et al. | 395/200 |
| 5,404,567 | 4/1995 | DePietro et al. | 455/6.3 |
| 5,414,455 | 5/1995 | Hooper et al. | 348/7 |
| 5,442,390 | 8/1995 | Hooper et al. | 348/7 |
| 5,529,265 | 6/1996 | Sakurai | 244/118 |
| 5,539,448 | 7/1996 | Verhille et al. | 348/6 |
| 5,555,466 | 9/1996 | Scribner et al. | 348/8 |
| 5,557,541 | 9/1996 | Schulhof et al. | 364/514 |
| 5,568,484 | 10/1996 | Margis | 348/8 |
| 5,572,442 | 11/1996 | Schulhof et al. | 455/4.2 |
| 5,581,270 | 12/1996 | Smith et al. | 345/2 |
| 5,586,937 | 12/1996 | Menashe | 463/41 |
| 5,596,647 | 1/1997 | Wakai et al. | 381/77 |
| 5,617,331 | 4/1997 | Wakai et al. | 348/8 |
| 5,631,693 | 5/1997 | Wunderlich et al. | 348/7 |

OTHER PUBLICATIONS

"BE Aerospace Interactive Video System Successfully Debuts on British Airways B747; Company Awarded $33 Million in New Seating Programs" Unlisted, *Business Wire* Nov. 21, 1995.

"TNCi Continues Airview(TM) Enhancement with Telephone Interface", Unlisted, *PR Newswire* Nov. 28, 1995.

"First Totally Digitalized In–Flight Entertainment System to be Introduced on International Carrier—Alitalia; IFT System will Debut on Rome to Chicago Flight Dec. 1st", Unlisted, *Business Wire* Nov. 30, 1995.

"TNC to Put Internet Service into its IFE", Unlisted, *In–Flight Entertainment* Jan. 1996.

"Two–Way Street", Harboson & Dunn, *Inflight* Mar. 1996.

"Airframers Force Discipline in High–Stakes IFE Market", Velocci, *Aerospace Business* Mar. 25, 1996.

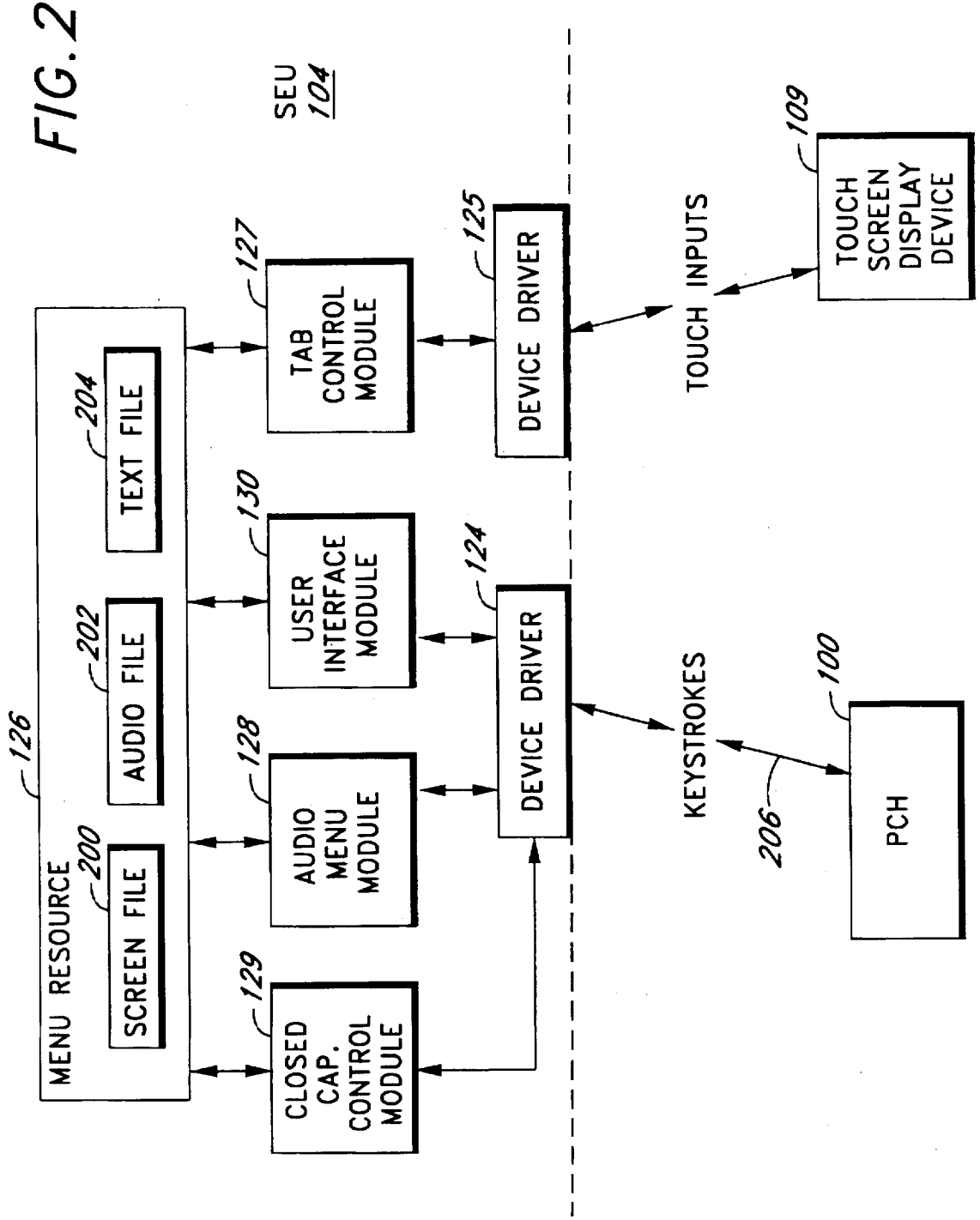

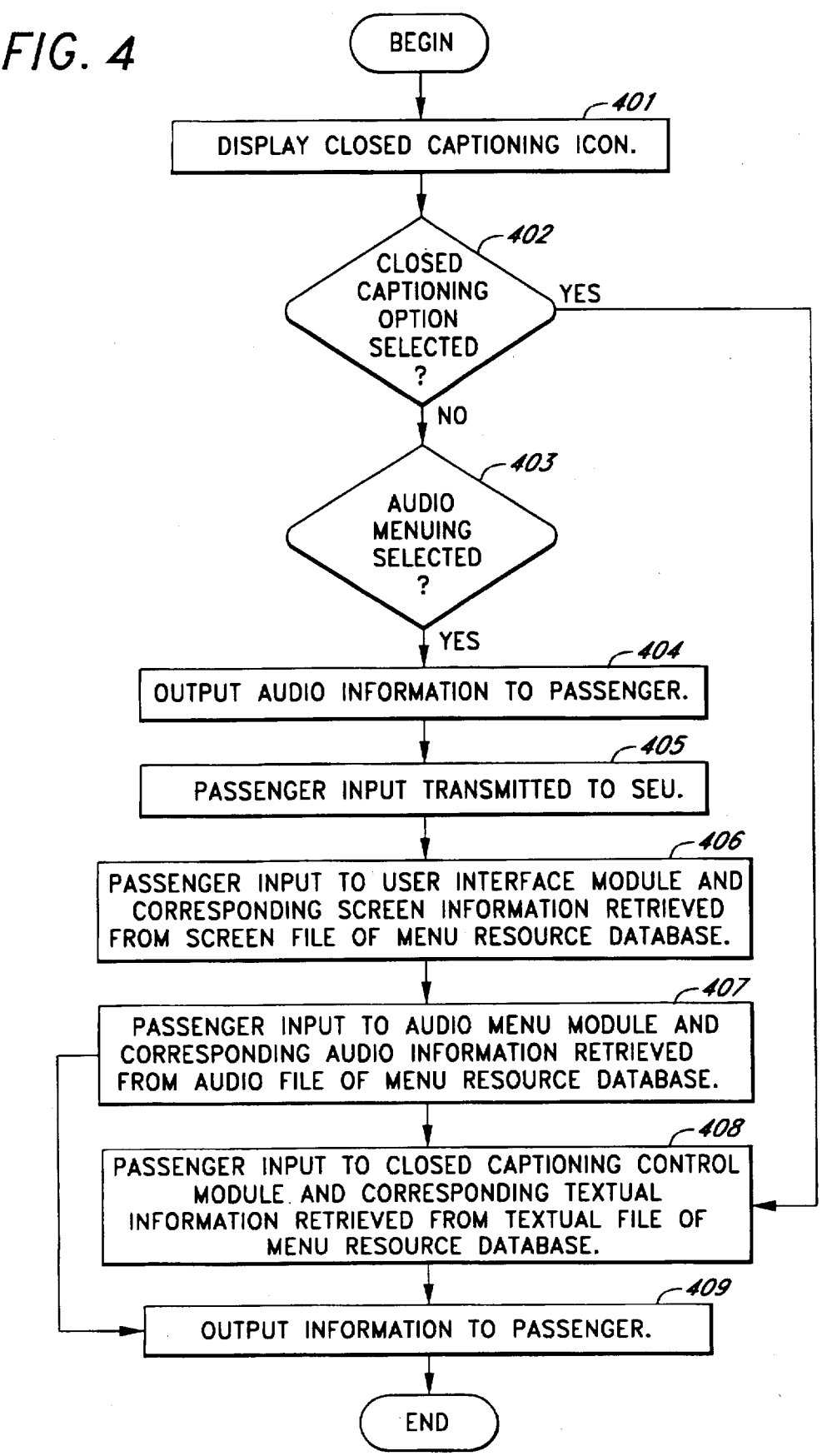

USER FRIENDLY PASSENGER INTERFACE INCLUDING AUDIO MENUING FOR THE VISUALLY IMPAIRED AND CLOSED CAPTIONING FOR THE HEARING IMPAIRED FOR AN INTERACTIVE FLIGHT ENTERTAINMENT SYSTEM

BACKGROUND OF THE INVENTION

(1) Field of the Invention

The present invention is related to the field of interactive flight entertainment systems, more specifically, the method and apparatus of the present invention is related to providing audio menuing for the visually impaired passengers, closed captioning for the hearing impaired passengers and a user friendly passenger interface for an interactive flight entertainment system.

(2) Related Art

In the past few years, there have been an increase in the number of commercial aircrafts providing in-flight entertainment for its passengers. A typical in-flight entertainment system provides some type of a passenger input device accepting inputs from a passenger and some type of a passenger output device such as a display device and a headset for outputting information to a passenger. The display device may output visual information including some type of a graphically displayed menu allowing a passenger to select from a number of options including movies, music and in-flight shopping options. Providing passengers with a user friendly user interface is one aspect of providing a good in-flight entertainment system.

Presently, video on demand in-flight entertainment systems are being developed by various companies.

One such in-flight entertainment has been developed by Interactive Flight Technologies, Inc. of Las Vegas, Nev. This system is advertised to allow a passenger to choose from among thirty feature films, gambling, on board shopping, video games and a graphical depiction of the route of the current flight and the airplane's current position along that route. A 9.5 inch video touch screen is provided as a user interface for each passenger unit.

Another in-flight entertainment system has been developed by B/E Aerospace, Inc. of Irvine, Calif. This system is advertised to provide a passenger with over five hundred channels for regular video programming including movies as well as live broadcast television and a variety of interactive features including video games. A user interface provided for this system is a traditional hand held unit providing various input buttons.

The existing in-flight entertainment systems ignore passengers with special needs. Currently, individuals who are visually impaired are unable to initiate and use an in-flight entertainment system without the help of a flight attendant or a fellow passenger. Further, although a hearing impaired passenger may initiate activities on an in-flight entertainment system using the visual cues displayed on a display device of the system, the hearing impaired passenger is not able to understand the audio information from the system.

It is therefore desirable to provide a user friendly passenger interface, more specifically, it is desirable to provide a method and an apparatus for audio menuing capabilities for the visually impaired and closed captioning capabilities for the hearing impaired passengers using an in-flight entertainment system. Additionally, the menu selection is currently typically made by a passenger through some type of a hand-held input device. An alternative method of input which is more efficient and user friendly, especially for the visually impaired and the hearing impaired passengers, is also desirable.

BRIEF SUMMARY OF THE INVENTION

The method and apparatus of the present invention provides a simple to use user friendly passenger interface for the visually impaired and the hearing impaired passengers for use with a passenger entertainment system for use in any type of passenger vehicle including airplanes, trains, buses and boats. More specifically, the present invention provides audio menuing capabilities for the visually impaired and closed captioning capabilities for the hearing impaired passengers as well as a graphical tab control input method and apparatus for use with a passenger entertainment system. For purposes of illustration, the present invention is described herein for use with an in-flight entertainment system (IFES) on board a commercial aircraft.

In one preferred embodiment of the present invention, boarding announcements and a seat display screen welcomes the passengers to the aircraft and introduce them to the IFES capabilities. At this time, a hearing impaired passenger may select a closed captioning option if so desired. To enable closed captioning capability in the IFES, a hearing impaired passenger simply selects a closed captioning option icon on the screen of the display device. Once such selection is made, all audio information is also printed and displayed to the passenger on the screen of the display device.

Once the headset to the entertainment system is installed for the passengers, an audio menuing option may be selected by a visually impaired passenger by pressing an audio option button on a passenger control handset (PCH). In one preferred embodiment of the present invention, the visually impaired passenger may be given a PCH with Braille raised dots (also referred herein as Braille dots) for easy tactile recognition of the input buttons on a PCH. The PCH may also be located on a seat arm of a passenger seat for easy location and retrieval of the PCH by a passenger.

The system uses an audio dialog to walk the passenger through the options available on the IFES menu displayed to the passengers on a display device. Each time a selection is made, an audio information is given to the passenger acknowledging the selection. Given inputs from the passenger through use of the PCH, keystroke inputs from a passenger are transmitted to a seat electronics unit (SEU) coupled to the PCH and processed by a device driver residing in a memory of the SEU. The device driver transmits the keystroke inputs to a user interface module and to the present invention's audio menu module. In one preferred embodiment, the user interface module and the audio menu module both reside in the memory of the SEU. The user interface and the audio menu modules access a menu resource database on the SEU to retrieve the appropriate passenger output in response to the passenger inputs (keystrokes). For the user interface module, the menu resource database makes available a file of various screen selections. For the audio menu module, the menu resource database makes available a file of various audio information corresponding to various passenger keystroke inputs. Once the appropriate passenger output information is retrieved from the menu resource database, the information is output to the passenger via a display device and a headset coupled to the SEU.

Alternate uses of the present invention includes utilizing a headset resident to the seat to enable visually impaired passengers to easily find the headset. Additionally, start-up video may be used to welcome hearing impaired passengers. The present invention also provides a user friendly input method and apparatus using a display device with a touch sensitive screen displaying graphical tab controls for paging to different menu and informational screens.

BRIEF DESCRIPTION OF THE DRAWINGS

FIG. 2 illustrates an embodiment of the seat electronics unit (SEU) and the passenger control handset (PCH).

FIG. 4 illustrates a flow diagram with the general steps followed by the present invention's audio menuing capability for the visually impaired passengers.

DETAILED DESCRIPTION OF THE INVENTION

The method and apparatus of the present invention provides a user friendly user interface for a passenger entertainment system for use with any passenger vehicle including airplanes, trains, buses and boats. More specifically, the present invention provides audio menuing capabilities for the visually impaired and closed captioning capabilities for the hearing impaired passengers and graphical tab control input method and apparatus for use with a passenger vehicle. For illustration purposes, a preferred embodiment is described for implementation with an interactive flight entertainment system (IFES) for use on a commercial aircraft. However, given the detailed description of the present invention, a person skilled in the art may implement the present invention in other types of passenger vehicles.

In one preferred embodiment of the present invention, once the headset to the IFES on board a commercial aircraft is installed for the passengers, an audio menuing option may be selected and the system uses an audio dialog to walk the passenger through the options available on the IFES menu. Each time a selection is made, the audio information is given to the passenger acknowledging the selection. If a closed captioning option is selected by the passenger, all audio information is also visually displayed to the passenger on their individual display device.

Figure 1:
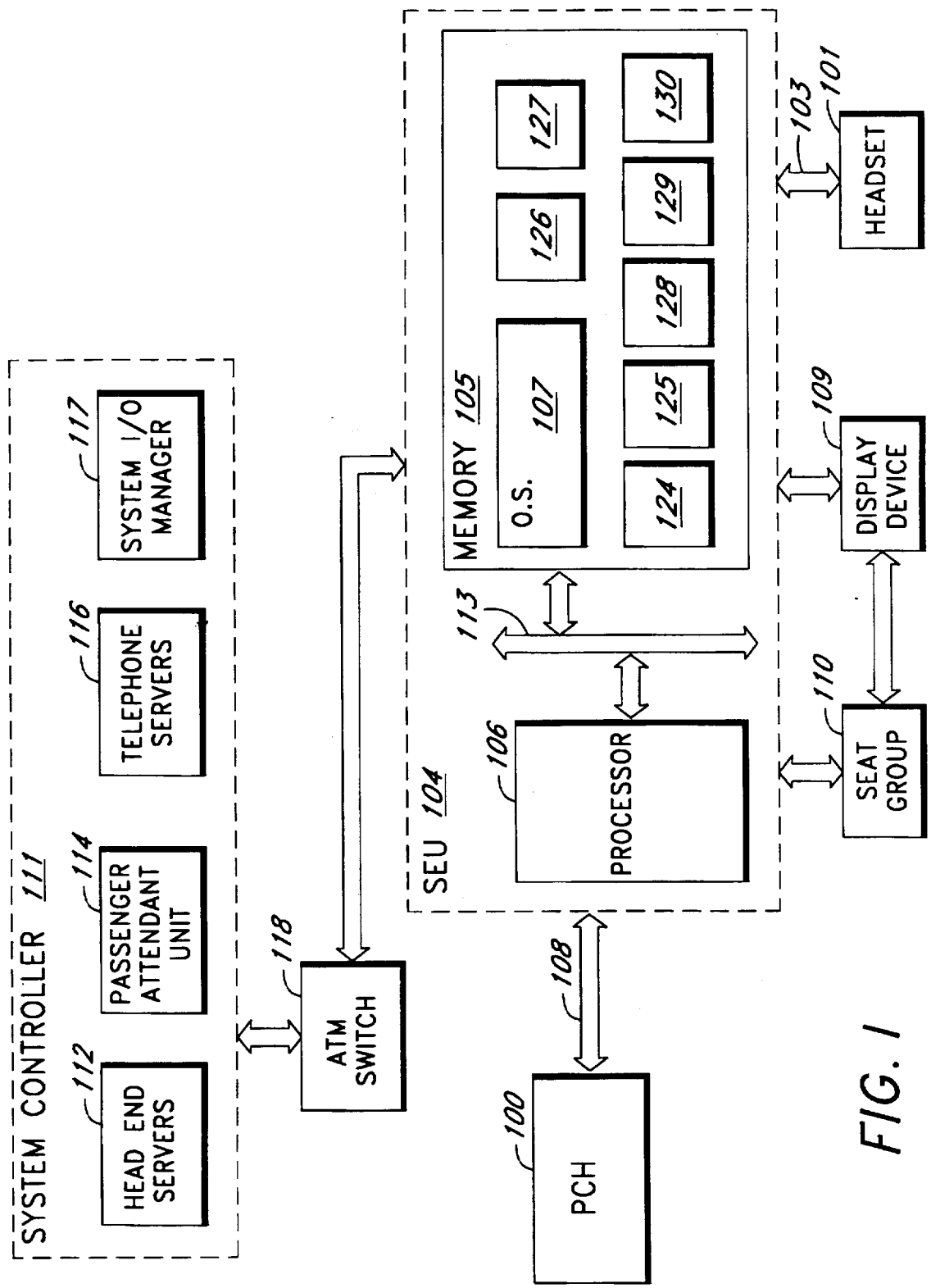
FIG. 1 illustrates an exemplary interactive flight entertainment system of the present invention.

FIG. 1 illustrates an exemplary interactive flight entertainment system (IFES) for use with the present invention's audio menuing, closed captioning and graphical tab control features.

The present invention is particularly suited for use with an integrated electronic system, typically situated in a commercial aircraft, such as an IFES that preferably supports interactive entertainment and other amenities available to its passengers such as described in co-assigned patent application Ser. No. 08/714,772 filed Sep. 16, 1996 entitled COMBINED DIGITAL AUDIO/VIDEO ON DEMAND AND BROADCAST DISTRIBUTION SYSTEM.

SEU 104 provides the passenger electronics responsible for the functionality which the passenger sees at their seat. In the illustrated embodiment, SEU 104 is located under each passenger seat group 110. In one preferred embodiment, a seat group 110 consists of two to three passenger seats in accordance with typical aircraft seat grouping. SEU 104 is coupled to passenger control handset (PCH) 100, head set 101 and liquid crystal display (LCD) display device 109. LCD 109 may be installed onto the back of each of the passenger seats or by mounting LCD 109 to an armrest of the passenger seat. Other types of relatively light weight and relatively high brightness and definition displays are acceptable for use with the present invention, including, for example, goggle-type LCD displays such as GLASTRON™ sold by Sony Corporation, Tokyo, Japan.

PCH 100 provides the passenger seat control switches and indicators. In one embodiment, PCH 100 is located in a seat arm of a passenger seat on board an aircraft. PCH 100 is interfaced with SEU 104 through PCH/SEU interface 108. PCH 100 of the present invention also has passenger audio head set jack 103 interfacing PCH 100 with headset 101.

In one embodiment, display device 109 has a touch sensitive screen capable of accepting passenger inputs to the IFES. A touch sensitive screen allows a passenger to interact with SEU 104 by touching an area on display device 109. The technology related to touch sensitive screens is well known in the art but not well adapted for use by the visually impaired.

SEU 104 also has processor 106 coupled to memory 105 through bus 113. Memory 105 has operating system 107, device driver 124, menu resource database 126, tab control module 127, audio menu module 128, closed captioning control module 129 and user interface module 130. Processor 106 is coupled to memory 105 by bus 113 and executes tab control module 127, audio menu module 128, closed captioning control module 129 and user interface module 130.

Menu resource database 126 contains a screen information file, a textual file and an audio file. The files contain predetermined information to be displayed on display device 109 or broadcast to the passenger through an audio output device such as headset 101 and corresponds to various passenger menu selections.

Figure 5:
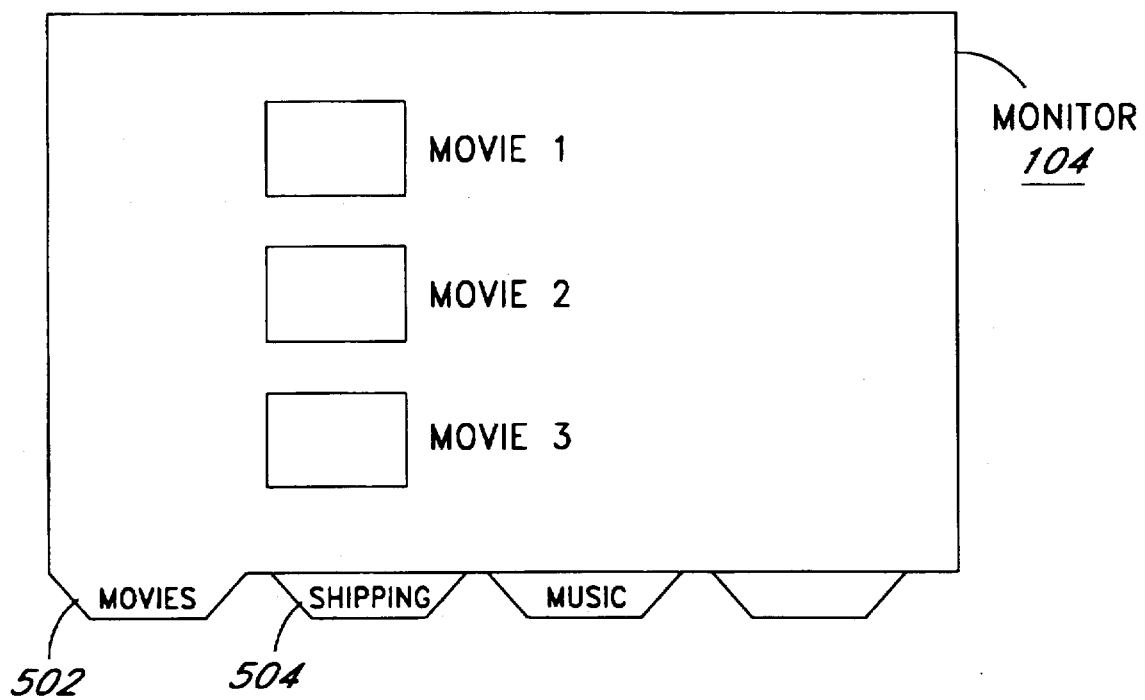
FIG. 5 illustrates exemplary touch screen display device displaying a menu corresponding to the graphical tab interface selected.

Audio menu module 128 processes passenger keystroke signals input through PCH 100 and outputs appropriate audio information to the passenger through headset 101. Tab control module 127, in conjunction with a display device with a touch sensitive screen, allows a passenger to select menu options by touching graphical tabs displayed on the bottom of the screen. An exemplary screen with exemplary graphical tabs is illustrated in FIG. 5. Once a tab is selected, graphical pages associated with the selected tab visually open themselves up to display further options. Closed captioning control module 129 displays a closed captioning option icon on the screen which when selected by a passenger, enables all audio information to the passenger to be approximately simultaneously textually displayed on the bottom of the screen.

SEU 104 is also coupled to system controller unit 111 having head end servers 112, passenger attendant unit 114, telephone server 116 and system input/output manager 117. The present invention's SEU 104 is particularly suited for implementation with the Windows 95® operating system. System controller unit 111 is particularly suited for implementation with the Windows NT® server. SEU 104 communicates with system controller unit 111 through asynchronous transfer mode (ATM) switch 118. Head end servers 112 provides centralized storage of various data, controls the delivery of the data throughout the interactive flight entertainment system and manages the entire interactive flight entertainment system. Passenger attendant unit 114 is used by the passenger attendants to generally control various aspects of the interactive flight entertainment system. Telephone server 116 controls the telephone performance of each SEU unit that has an on board telephone. System input/output manager 117 manages the input and output of data between head end servers 112 and various peripheral devices such as an overhead video console and a passenger attendant audio system (both not shown).

In one embodiment SEU 104 may be supported by Institute of Electrical and Electronic Engineers (IEEE) Bus Specification 1394 seat distribution network interface for communication to the system head end. SEU 104 may also provide AMPAC digital audio and video decoding to provide audio and video outputs as well as to provide game playing and graphics display capabilities.

FIG. 2 illustrates an embodiment of the seat electronics unit (SEU) coupled to a passenger control handset (PCH). As mentioned previously, SEU 104 provides the passenger electronics that is responsible for the functionality that the passenger sees at the seat. In this embodiment, SEU 104 is located under each passenger seat group 110 and has user interface module 130, menu resource database 126, tab control module 127, audio menu module 128, closed captioning control module 129. SEU 104 also has device driver 124 and device driver 125. Device driver 124 is capable of accepting keystroke signals from PCH 100 and transmitting the keystroke signals to user interface module 130 and to audio menu module 128. Device driver 125 is capable of accepting touch inputs by a passenger to a touch sensitive screen and transmitting the touch input information to tab control module 127.

More specifically, given the keystroke signals, user interface module 130 retrieves the corresponding screen information from screen information file 200 of menu resource database 126 and outputs the screen information onto display device 104. Audio menu module 128 retrieves the appropriate audio information from audio file 202 in menu resource database 126 which corresponds and/or responds to the passenger keystroke signals and outputs the audio information to the passenger via headset 101. If the closed captioning option is selected by a passenger, then closed captioning control module 129 retrieves the appropriate textual information from textual file 204 in the menu resource database 126 which corresponds and/or responds to the passenger keystroke signals and displays the textual information to the passenger via display device 109.

Tab control module 127, audio menu module 128 and closed captioning module 129 may be separately implemented or implemented as software modules executed by a processor in SEU 104 as was illustrated in FIG. 1.

Figure 3A:
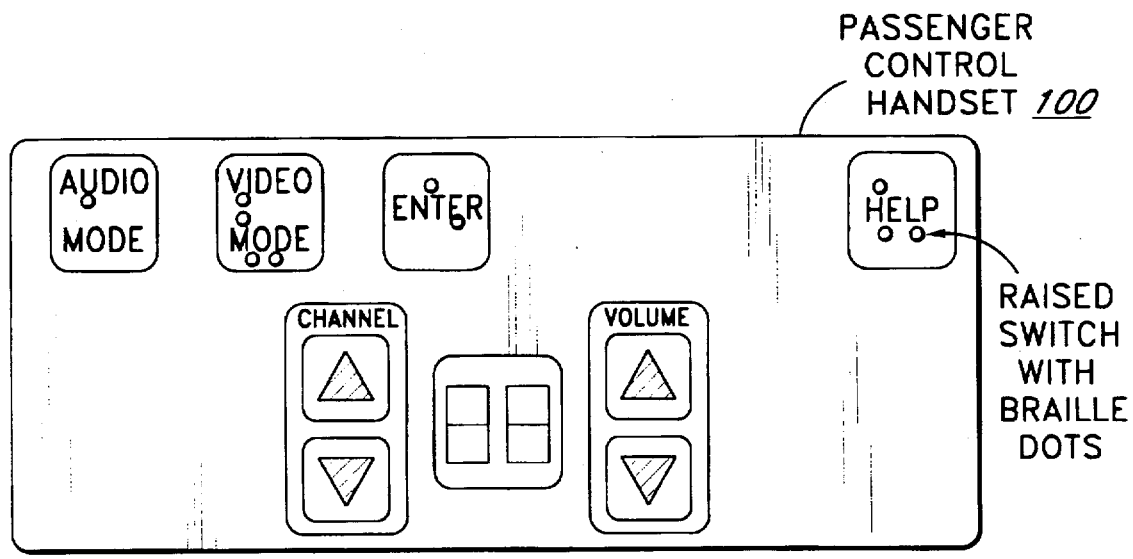
FIG. 3a illustrates a passenger control handset (PCH) for visually impaired passengers.
Figure 3B:
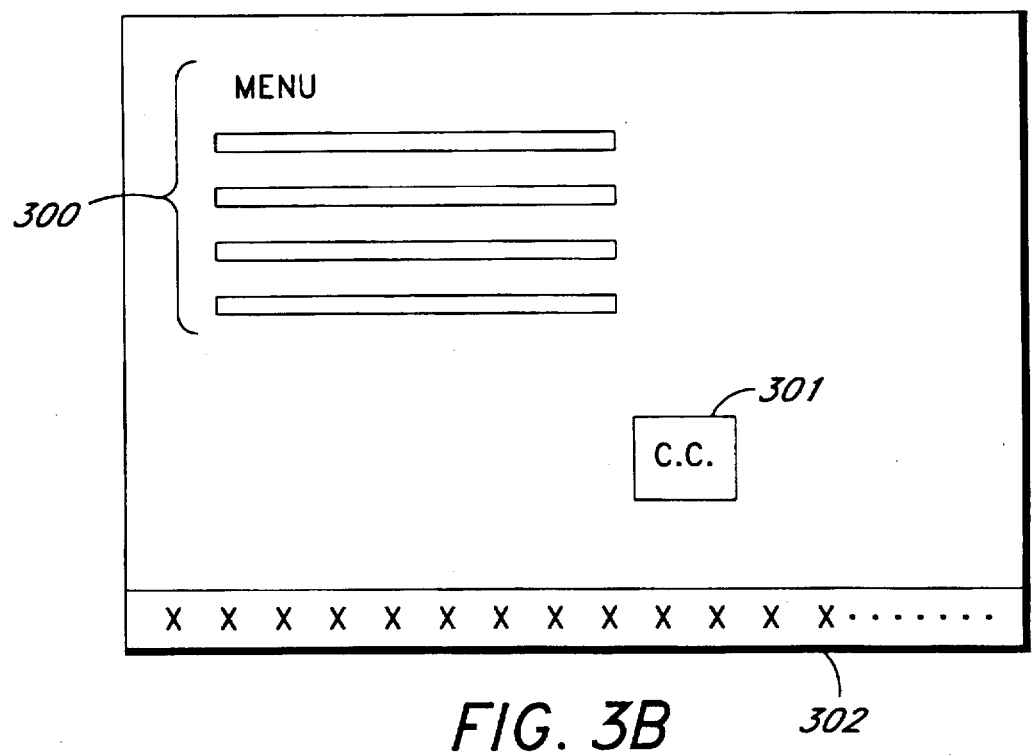
FIG. 3b illustrates an exemplary display device displaying an exemplary menu, an exemplary closed caption option icon and an exemplary closed captioning text.

FIG. 3a illustrates a passenger control handset (PCH) for visually impaired passengers. PCH has raised switches with appropriate Braille dots on the surface of each of the raised switches to enable visually impaired passengers to recognize different switches on the PCH by touch. In one embodiment, the PCH is mounted on a passenger seat arm and coupled to the seat by a retractable cord. In an alternate embodiment, the PCH is an independent unit couplable to a passenger seat for use by a passenger through, for example, a plug-in cord. Such a plug-in PCH may be distributed to passengers according to each passengers specific disabilities (e.g. a PCH with Braille dots for the visually impaired passenger, a large scale PCH with large input buttons for passengers with arthritis and breath responsive PCH which converts breath inputs received through a breathing tube into control signals using a transducer for input to the IFES for passengers who are unable to move their hands or legs.) FIG. 3b illustrates an exemplary screen with exemplary menu 300, exemplary closed caption option icon 301 and exemplary closed captioning text 302.

FIG. 4 illustrates the general steps followed by the present invention's audio menuing capability for the visually impaired and closed captioning capability for the hearing impaired passengers using the IFES. In step 401, a closed captioning option icon is displayed to the passenger on their display device. In step 402, the closed captioning option may be selected by a passenger. In step 403, a passenger also has the option to select an audio menuing option by pressing an audio mode button on the PCH.

In step 404, if the audio menuing option is selected, the SEU outputs audio information to the passenger regarding the menu selections available as well as the instructions for selecting menu selections. For example, a passenger may hear the following audio information: "This is the Movie Menu. Selection one is movie one. If you would like to select movie one, please press the enter key now." As each menu selection is being output to the passenger through some type of audio output device such as a headset, the visually impaired passengers may be given a set of time within which to select that given menu option by pressing the raised enter switch on the PCH (an embodiment illustrated in FIG. 3a) with the corresponding Braille information.

In step 405, once a menu selection is made by the passenger using the PCH, the keystroke signals corresponding to the selection is transmitted from the PCH to the SEU and processed by the device driver. The device driver transmits the necessary keystroke information to the user interface module in step 406. In step 407, at the same time, the device driver transmits the necessary keystroke information to the audio menu module for processing. The user interface module retrieves the screen information corresponding to the user input from the screen information file of the menu resource database. The audio menu module retrieves the audio information corresponding to the user input from the audio file of the menu resource database.

Back in step 402, if the closed captioning option is selected, then all audio information is approximately simultaneously displayed to the passenger on their display device. In step 408, the closed captioning control module accepts keystroke signals from the passenger via the PCH. The closed captioning control module retrieves the screen information corresponding to and/or responding to the passenger input from the screen information file of the menu resource database. In step 409, the information is output to the passenger.

FIG. 5 illustrates an exemplary touch sensitive screen displaying a menu page corresponding to the visually displayed tab selected. Tab 502 designated as "movies" may be selected by the passenger by touching the screen surface of the visually displayed tab. As mentioned previously, the technology related to touch sensitive screens is well known in the art.

If the passenger desires to select the in-flight shopping option, the passenger may select such option by simply touching tab 504 corresponding to the in-flight shopping option. The passenger may charge for their purchases by sliding their credit card through a credit card reader (e.g. a magnetic strip card reader) which may be adapted in one embodiment of the present invention along one side of the PCH. Once the in-flight shopping option is selected, the page for movie 502 then closes and the page for shopping option 504 graphically opens, displaying the menu selection for shopping option tab 504. Other selections may also be selected by the passenger in a similar manner. Additionally, audio information regarding the tabs selected and the menu options displayed is output to the passenger if the audio mode is selected.

Figure 6:
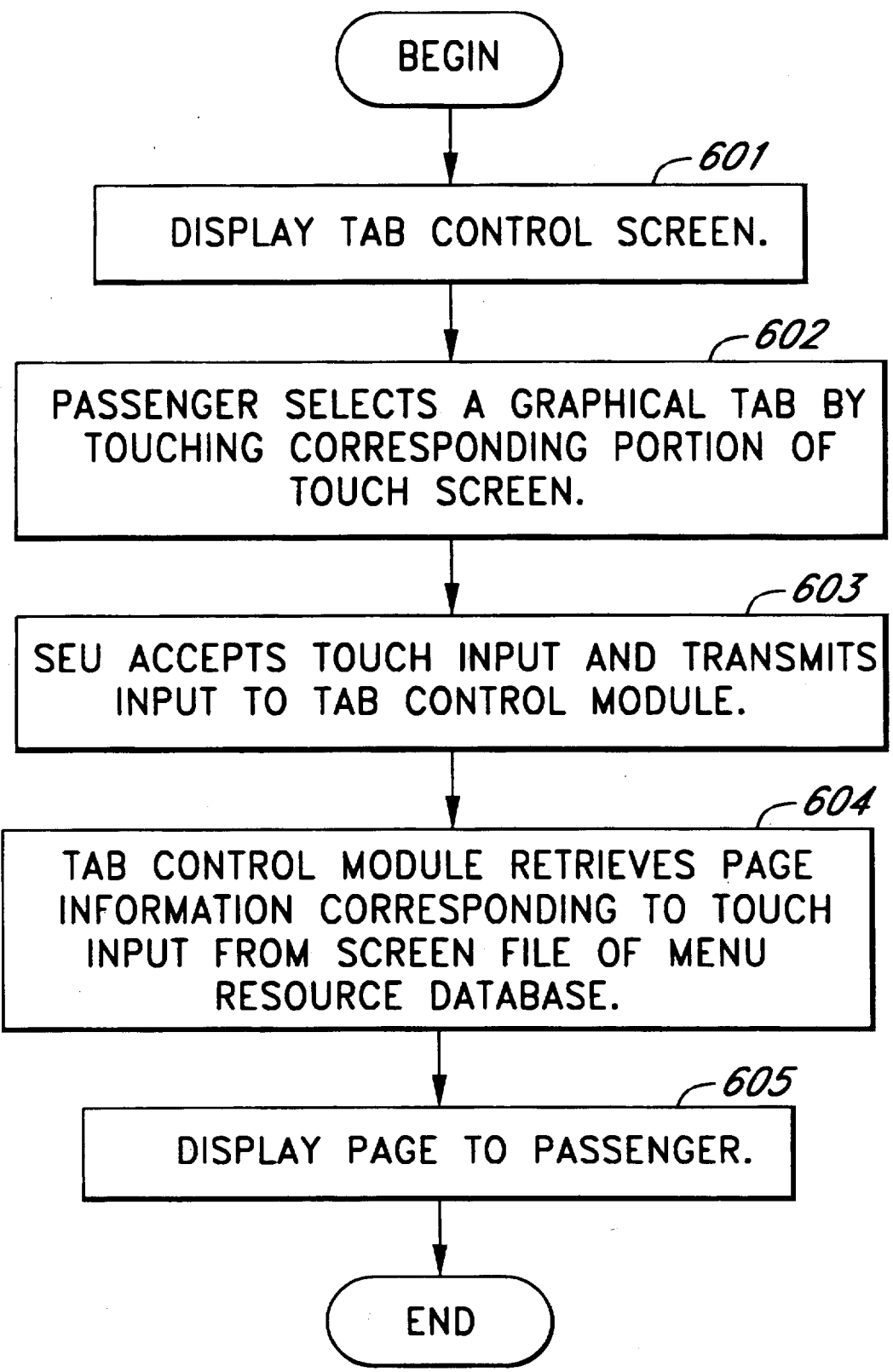
FIG. 6 illustrates a flow diagram with the general steps followed by the present invention's graphical tab control feature.

FIG. 6 illustrates a flow diagram with the general steps followed by the present invention's tab control module. In step 601, a tab control enabled menu is displayed on a screen to the passenger. In step 602, a passenger selects one of the tabbed options by touching the screen using some type of a pointing device. In step 603, a device driver residing on the SEU accepts the touch screen input and transmits the input to the tab control module. In step 604, the tab control module retrieves the screen information corresponding to the touch input from the screen information file of the menu resource database. For example, given a movie tab input, a movie menu page screen is retrieved. In step 605, the retrieved screen information is then graphically displayed to the user on the display device.

What has been described is a method and an apparatus for audio menuing capabilities for the visually impaired and closed captioning capabilities for the hearing impaired passengers using an interactive flight entertainment system (IFES). The present invention also provides passengers with a user friendly input method and apparatus using a touch sensitive screen displaying a tab control enabled menu. Further, the present invention may be implemented with passenger entertainment systems of other types of passenger vehicles including trains, buses and boats.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. An apparatus for an efficient user interface for an in-flight entertainment system (IFES) comprising:

an audio output device for outputting audio information to a user of the IFES;

a display device for displaying visual information to said user of the IFES including a closed captioning icon;

a seat electronics unit (SEU) for selectively providing audio menuing for visually impaired users and closed captioning for hearing impaired users, said SEU coupled to said display device and said audio output device, said audio menuing configured to provide audio feedback identical to all textual output displayed through said display device to said user and said closed captioning configured to provide visual feedback identical to all audio information output through said audio output device to said user; and a passenger control handset (PCH) coupled to said SEU for accepting user inputs from said user, said inputs to be transmitted to said SEU for processing.

2. The apparatus of claim 1 wherein said display device comprises a touch sensitive screen.

3. The apparatus of claim 1 wherein said PCH comprises Braille dots corresponding to the functionality of each input portion on said PCH.

4. The apparatus of claim 1 wherein said SEU further comprises:

a storage device having an audio menu module for providing audio information for all textual output displayed through said display device to said user, a closed captioning module for enabling display of all audio information to said passenger into visually recognizable textual information displayed on the screen on said display device and a tab control module for controlling the display of menu options corresponding to the visually displayed tabs selected through use of said touch sensitive screen; and a processor for running said audio menu module, closed captioning module and tab control module.

5. The apparatus of claim 4 wherein said audio menu module provides audio information to said user of all textual information displayed on said display device by retrieving audio information from an audio file of a menu resource database also residing in said storage device and providing audio information of said retrieved audio information to said user.

6. The apparatus of claim 4 wherein said closed captioning module provides textual information to be displayed on said display device to said user by retrieving screen information from said menu resource database corresponding to audio information provided to said user.

7. The apparatus of claim 4 wherein said tab control module provides visually displayed menu options by retrieving screen information from said menu resource database in response to visually displayed tab selected by said user touching said tab on said touch sensitive screen.

8. A method for an efficient user interface for an in-flight entertainment system (IFES) comprising the step of:

providing audio information identical to all textual output displayed to a user using said IFES in response to said user selecting an audio menuing option, said IFES having at least one display device through which said textual output is displayed and at least one audio information device through which said audio information is output said audio information prompting said user for inputs and identifying the displayed information on said display device.

9. The method of claim 8 further comprising the step of providing closed captioning visual information to said user of the IFES, said closed captioning visual information being displayed on said display device in response to said user selecting a closed captioning option of the IFES.

10. The method of claim 8 wherein said step of providing audio information further comprises the step of retrieving audio information from an audio file of said menu resource database in response to keystroke signals input by said user, said menu resource database residing in a memory of a seat electronics unit (SEU) of said IFES.

11. The method of claim 10 further comprising the step of outputting said audio information to the user.

12. The method of claim 9 wherein said step of providing closed captioning information to said user further comprises the step of retrieving textual information from a closed captioning file in said menu resource database for display onto said display device to said user approximately simultaneously to the audio information to said user.

13. The method of claim 8 further comprising the step of:

accepting user inputs through a touch screen display device, said touch screen display device displaying tabs corresponding to IFES passenger options, said tabs being selected by said user when said user touches said displayed tab; and visually displaying a menu option corresponding to said selected tab option.

14. The method of claim 13 further comprising the step of retrieving screen information corresponding to the accepted tab option from a screen file in said menu resource database.

15. An in-flight entertainment system (IFES) providing efficient user interface comprising:

an audio output device for outputting audio information to a user of the IFES;

a display device for displaying visual information to said user of the IFES including an closed captioning icon;

a seat electronics unit (SEU) for providing audio menuing for the visually impaired users and closed captioning for the hearing impaired users, said SEU coupled to said display device and said audio output device;

a passenger control handset (PCH) coupled to said SEU for accepting user inputs from said user, said inputs to be transmitted to said SEU for processing; and a controller mechanism for controlling the IFES, said controller mechanism interfaced with said SEU through an asynchronous transfer mode switch.

16. The system of claim 15 wherein said display device comprises a touch sensitive screen.

17. The system of claim 15 wherein said PCH comprises Braille dots corresponding to the functionality of each input portion on said PCH.

18. The system of claim 15 wherein said seat electronics unit further comprises:

a storage device having an audio menu module for providing audio information identical to all textual output displayed through said display device to said user, a closed captioning module for enabling display on said display device visually recognizable textual information identical to all audio information output to said user and tab control module for controlling the display of menu options corresponding to the visually displayed tabs selected through use of said touch screen; and a processor for running said audio menu module, closed captioning module and tab control module.

19. The system of claim 18 wherein said audio menu module provides audio information to said user of all textual information displayed on said display device by retrieving audio information from an audio file of a menu resource database also residing in said storage device and providing audio information of said retrieved audio information to said user.

20. The system of claim 18 wherein said closed captioning module provides textual information for display on said display device to said user by retrieving screen information from said menu resource database corresponding to audio information provided to said user.

21. The system of claim 18 wherein said tab control module provides visually displayed menu options by retrieving screen information from said menu resource database in response to visually displayed tab selected by said user touching said tab on said touch screen.

22. An in-flight entertainment system (IFES) comprising:

a seat electronics unit (SEU) coupled to individual passenger display devices and individual passenger audio output devices;

a controller unit coupled to said SEU having, a storage device containing a plurality of software modules of which at least one is used to provide audio information identical to all textual output displayed through said individual passenger display device, at least one module is used to enable display on said individual passenger display device visually recognizable textual information identical to audio information output and at least one module used to control the display of menu options corresponding to the visually displayed tabs selected through use of a touch screen, and a processor coupled to said storage device and used to execute said plurality of software modules;

a switch device interfacing said SEU with said controller unit; and a passenger control handset (PCH) coupled to said SEU, said PCH used to accept user inputs from a passenger, said inputs transmitted to said SEU for processing.

23. A passenger entertainment system comprising:

a menu resource database containing a plurality of screen information and audio information for output to a user through an individual passenger display device or an individual passenger audio device;

an audio menu module coupled to said menu resource database and used to provide audio information identical to all textual output displayed through said individual passenger display device;

a closed captioning module coupled to said menu resource database and used to convert all audio information into visually recognizable textual information displayed on said individual passenger display device; and a tab control module coupled to said menu resource database and used to control the display of menu options corresponding to the visually displayed tabs selected through use of said individual passenger display device having a touch sensitive screen.

* * * * *